United States Patent
Fusco

(10) Patent No.: US 10,798,246 B2
(45) Date of Patent: Oct. 6, 2020

(54) CALL COLLISION RESOLUTION IN A COMMUNICATION NETWORK

(71) Applicant: Telecom Italia S.p.A., Milan (IT)

(72) Inventor: Antonio Fusco, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 16/469,444

(22) PCT Filed: Dec. 23, 2016

(86) PCT No.: PCT/EP2016/082549
§ 371 (c)(1),
(2) Date: Jun. 13, 2019

(87) PCT Pub. No.: WO2018/113992
PCT Pub. Date: Jun. 28, 2018

(65) Prior Publication Data
US 2020/0045180 A1    Feb. 6, 2020

(51) Int. Cl.
*H04M 3/42* (2006.01)
*H04M 3/56* (2006.01)
*H04L 29/06* (2006.01)
*H04M 7/00* (2006.01)

(52) U.S. Cl.
CPC .......... *H04M 3/56* (2013.01); *H04L 65/1006* (2013.01); *H04L 65/1016* (2013.01); *H04M 7/006* (2013.01); *H04M 2203/5063* (2013.01)

(58) Field of Classification Search
CPC ............ H04M 3/56; H04M 2203/5063; H04L 65/1006

USPC ............................................. 379/202.01, 158
See application file for complete search history.

(56) References Cited

U.S. PATENT DOCUMENTS

| | | | |
|---|---|---|---|
| 3,637,946 A * | 1/1972 | Hamrick ............. | H04Q 3/0016 379/241 |
| 5,381,415 A * | 1/1995 | Mizutani ............ | H04Q 11/0428 370/447 |
| 5,566,236 A * | 10/1996 | MeLampy ........ | H04M 3/42229 379/210.01 |
| 6,445,918 B1 * | 9/2002 | Hellander ............ | H04W 76/10 455/423 |
| 6,633,760 B1 * | 10/2003 | Ham .................... | H04Q 3/0025 455/414.1 |

(Continued)

FOREIGN PATENT DOCUMENTS

CN      105207973 A      12/2015

OTHER PUBLICATIONS

Jun. 28, 2018—(WO) Int'l Search Report and Written Opinion—App PCT/EP2016/082549.

(Continued)

*Primary Examiner* — William J Deane, Jr.
(74) *Attorney, Agent, or Firm* — Banner & Witcoff, Ltd.

(57) ABSTRACT

A method is provided for resolving a call collision in a communication network. The method comprises, at a network node of the communication network: receiving a first call request message from a first user device to set up a call from the first user device to a second user device; checking whether the second user device has in turn sent a second call request message to set up a call from the second user device to the first user device; and in the affirmative, routing the first call request message to a conference bridge.

15 Claims, 2 Drawing Sheets

(56) References Cited

U.S. PATENT DOCUMENTS

| | | | | |
|---|---|---|---|---|
| 6,782,094 B1* | 8/2004 | Venz | H04M 3/10 | |
| | | | 379/229 | |
| 7,466,991 B2* | 12/2008 | Everson | H04L 29/06027 | |
| | | | 455/432.3 | |
| 7,894,800 B2* | 2/2011 | Ignatin | H04M 3/424 | |
| | | | 455/414.1 | |
| 8,331,545 B2* | 12/2012 | Lingafelt | H04L 12/1831 | |
| | | | 379/202.01 | |
| 8,401,545 B2* | 3/2013 | Tal | H04M 3/42374 | |
| | | | 455/425 | |
| 8,582,745 B1 | 11/2013 | Chitnis et al. | | |
| 8,644,811 B2* | 2/2014 | Tsao | H04W 76/19 | |
| | | | 455/418 | |
| 8,755,502 B1* | 6/2014 | Schlesener | H04M 3/42 | |
| | | | 379/201.01 | |
| 2002/0090947 A1* | 7/2002 | Brooks | H04W 76/19 | |
| | | | 455/436 | |
| 2005/0048981 A1* | 3/2005 | Anupam | H04W 76/19 | |
| | | | 455/445 | |
| 2005/0070286 A1* | 3/2005 | Awasthi | H04W 76/19 | |
| | | | 455/436 | |
| 2007/0274488 A1* | 11/2007 | Callaghan | H04M 1/72519 | |
| | | | 379/201.01 | |
| 2012/0188892 A1* | 7/2012 | Demilie | H04M 3/42272 | |
| | | | 370/252 | |
| 2020/0145473 A1* | 5/2020 | Cumaranatunge | | |
| | | | H04L 65/1003 | |

OTHER PUBLICATIONS

3GPP TS 23.228 V14.1.0 (Sep. 2016), "3rd Generation Partnership Project; Technical Specification Group Services and System Aspects; IP Multimedia Subsystem (IMS); Stage 2 (Release 14)", section 4.6.3, pp. 47-49.

3GPP TS 23.228 V14.1.0 (Sep. 2016), "3rd Generation Partnership Project; Technical Specification Group Services and System Aspects; IP Multimedia Subsystem (IMS); Stage 2 (Release 14)", section 4.2.4, pp. 28-34.

3GPP TS 23.002 V14.0.0 (Sep. 2016), 3rd Generation Partnership Project; Technical Specification Group Services and System Aspects; Network architecture (Release 14), section 4.1.1.1, pp. 22-27.

* cited by examiner

CALL COLLISION RESOLUTION IN A COMMUNICATION NETWORK

TECHNICAL FIELD

The present invention relates to the field of communication networks. In particular, the present invention relates to a method for resolving a call collision in a communication network, in particular an IP Multimedia Subsystem (IMS) network.

BACKGROUND ART

Call collision refers to the situation according to which two users of a communication network call each other substantially simultaneously.

This situation may arise when a user A and a user B of the communication network are engaged in a phone call and, for some reason, the call drops. Usually, both the user A and the user B try to call each other at the same time, and both attempts fail because the called user is busy. In this case, both user A and user B will get a busy signal through the phone. Successive attempts may also fail, until one of the users chooses to wait for a call from the other user and stops trying calling her/him.

CN105207973 discloses an interworking method to allow subscribers in an IMS communication system to call each other at the same time. The method comprises the following steps: if the system detects that both the calling and called subscribers have activated a service to avoid call conflicts, and the calling and called subscribers call each other at the same time, one path in the two independent calls initiated by the calling and called subscribers is removed according to a call conflict handling strategy, and the other path is connected.

SUMMARY OF THE INVENTION

The Applicant has noticed that the method of CN105207973 implies that the IMS communication system drops one of the incoming calls. In this case, one of the two users, for example user B, has her/his call rejected for no apparent reason, while the call from user A to user B is allowed to set up. This situation may confuse user B, who may try to call user A again. However, if this second attempt from user B starts before the allowed call from user A reaches user B, user A will get a busy signal anyway.

Moreover, user B, whose call has been dropped, may not notice that her/his call has been dropped, since she/he may have just started a new call attempt to user A and has the phone close to the ear. In this case, when the allowed call from user A to user B reaches user B, the phone of user B may start ringing while user B his holding the phone close to the ear. User B may then experience an unexpected, and somewhat unpleasant, situation as she/he becomes aware of the fact the her/his phone is ringing while she/he was still trying to call user A.

In view of the above, the Applicant has tackled the problem of providing a method for resolving a call collision in a communication network, in particular an IP Multimedia Subsystem (IMS) network, which allows enabling two users of the communication network to successfully call each other at substantially the same time while overcoming the drawbacks discussed above. In particular, the Applicant has tackled the problem of providing a method for resolving a call collision in a communication network, in particular an IP Multimedia Subsystem (IMS) network, which allows resolving the call collision without dropping one of the incoming calls, thus improving the user's experience with respect to the known method described above.

In the following description and in the claims, the expression "call collision resolution service" refers to a service provided in the considered communication network by a service provider for resolving a call collision between two users of the communication network according to the method of the present invention.

According to a first aspect, the present invention provides a method for resolving a call collision in a communication network, the method comprising, at a network node of the communication network:

a) receiving a first call request message from a first user device to set up a call from the first user device to a second user device;

b) checking whether the second user device has in turn sent a second call request message to set up a call from the second user device to the first user device; and c) in the affirmative, routing the first call request message to a conference bridge.

Preferably, receiving the first call request message comprises modifying the first call request message by inserting therein an identifier of the network node.

Preferably, the method further comprises, after step a), receiving from the second user device an answer message indicating that the second user device is busy, and checking comprises sending an inquiry message to a further network node of the communication network indicating that the first user device sent the first call request message and asking if the second user device sent the second call request message.

Preferably, the method further comprises, at the further network node, storing an information indicating that the first user device sent the first call request message and sending to the network node an outcome message indicating that the second user device has not sent the second call request message.

Preferably, the method further comprises, at the network node, upon reception of the outcome message, interrupting the call from the first user device to the second user device for a pre-determined interval of time.

Preferably, the method further comprises, after the pre-determined time interval elapsed, sending a further inquiry message to the further network node of the communication network asking if the second user device sent the second call request message.

According to an embodiment, routing further comprises modifying the first call request message by inserting therein an identifier of the conference bridge to route the first call request message to the conference bridge.

According to another embodiment, routing further comprises generating a third call request message to set up a call from the network node to the conference bridge and inserting in the third call request message an identifier of the conference bridge to route the third call request message to the conference bridge.

Preferably, the method further comprises determining the identifier of the conference bridge as a function of identifiers associated with the first user device and the second user device.

Preferably, the method further comprises:

receiving the second call request message from the second user device to set up a call from the second user device to the first user device;

checking whether the first user device has in turn sent the first call request message to set up the call from the first user device to the second user device; and in the affirmative, routing the second call request message to the conference bridge.

According to a second aspect, the present invention provides computer program product loadable in the memory of a computer and including software code portions for performing the steps of the method as set forth above, when the product is run on the computer.

According to a third aspect, the present invention provides a network node for a communication network in a communication system further comprising a first user device and a second user device, the network node being configured to:

receive a first call request message from the first user device to set up a call from the first user device to the second user device;
check whether the second user device has in turn sent a second call request message to set up a call from the second user device to the first user device; and
in the affirmative, route the first call request message to a conference bridge.

According to a fourth aspect, the present invention provides a communication system comprising a communication network, a first user device and a second user device, each of the first user device and a second user device being configured to set up a call with the other user device through the communication network, wherein the communication network comprises a network node as set forth above.

Preferably, the communication network is an IP multimedia subsystem network and the network node is an application server of the communication network.

Preferably, the first call request message is a SIP INVITE message.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
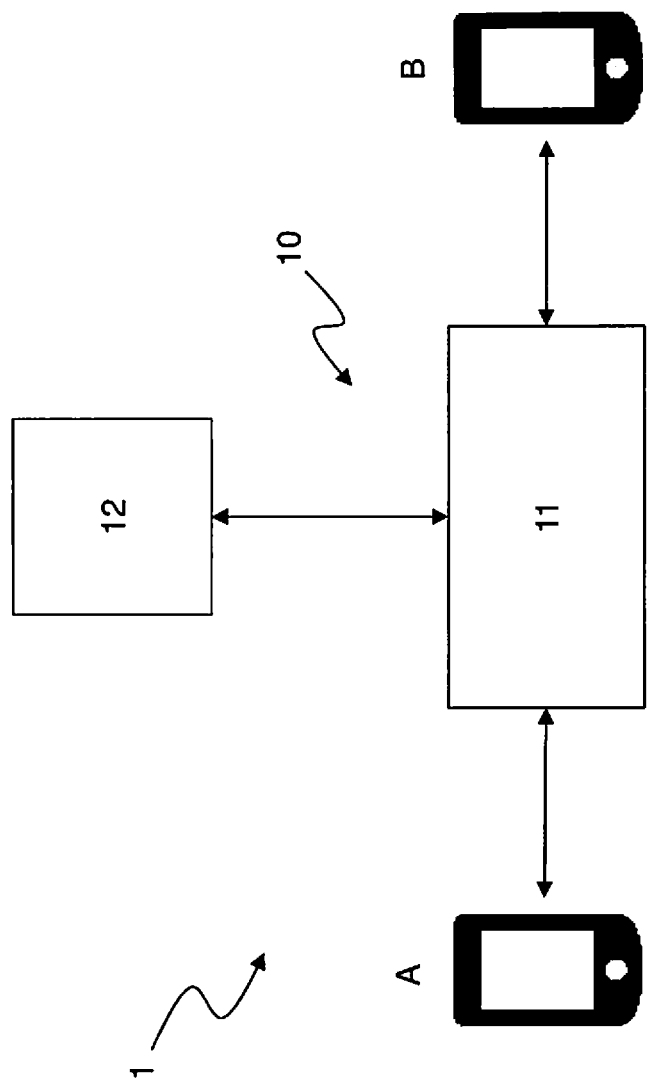
FIG. 1 schematically shows a portion of a communication network configured to implement the method according to the present invention.

FIG. 1 schematically shows a communication system 1 configured to implement the method according to the present invention. The communication system 1 preferably comprises a communication network 10 configured to deliver multimedia communication services over IP (Internet Protocol), among which voice call services. In particular, the communication network 10 may be a 3GPP IP Multimedia Subsystem (IMS) network.

FIG. 1 shows that the communication system 1 further comprises a first user device A and a second user device B. Each user device is preferably configured to connect to the communication network 10 for enabling the respective user A, B to establish a multimedia communication session, in particular a voice call, with another user B, A. Each user device may be, e.g., a telephone, a softphone (a virtual phone implemented by a software application on a computer) and/or a portable user device such as a smartphone, a tablet, etc. In the following description, labels "A" and "B" will be used to indicate either the user devices or the corresponding users.

The communication network 10 is preferably configured to implement a communication session protocol for signaling and controlling multimedia communication sessions. In particular, the considered exemplary IMS network 10 is preferably configured to implement the known Session Initiation Protocol (SIP) for signaling and controlling multimedia communication sessions.

The communication network 10 preferably comprises a first network node 11. The first network node 11 is preferably configured to route requests coming from any user device A, B wishing to establish a multimedia communication session with another user device B, A through the communication network 10. The request is preferably formatted according to the considered communication session protocol. Moreover, the first network node 11 is configured to process the signaling messages used to set up and maintain the multimedia communication session. In the considered IMS network, the first network node 11 is preferably a SIP server implementing a so-called Call Session Control Function (CSCF). In particular, the first network node 11 may be a SIP server handling the session states in the communication network, such as the serving-CSCF server, also called S-CSCF server, described in the technical specification 3GPP TS 23.228 V14.1.0 (2016-09), "3rd Generation Partnership Project; Technical Specification Group Services and System Aspects; IP Multimedia Subsystem (IMS); Stage 2 (Release 14)", section 4.6.3.

The requests coming from the user devices A, B may reach the first network node 11 though other intermediate network nodes that are not shown in FIG. 1. In the considered IMS network, these intermediate network nodes may comprise a proxy-CSCF (P-CSCF) server, which may be the first point of contact of the user device A, B with the IMS network.

The communication network 10 further preferably comprises a second network node 12 connected to the first network node 11. The second network node 12 is preferably a server configured to host and execute a service delivered in the communication network 10 by a service provider. Preferably, the second network node 12 is an application server (AS) in the considered IMS network. More, preferably, the application server 12 is a SIP application server. According to the present invention, the second network node 12 is configured to host and execute a call collision resolution (CCR) service, as it will be described in greater detail herein after.

The second network node 12 is preferably configured to establish a bidirectional communication with the first network node 11 using the communication session protocol mentioned above. In particular, according to the present invention, the first network node 11 and the second network node 12 are connected via an interface not shown in FIG. 1. Such interface may be the standard IP Multimedia Subsystem Service Control Interface (ISC) described in the technical specification 3GPP TS 23.228 V14.1.0 (2016-09), "3rd Generation Partnership Project; Technical Specification Group Services and System Aspects; IP Multimedia Subsystem (IMS); Stage 2 (Release 14)", section 4.2.4.

Preferably, the communication network 10 comprises one or more network nodes configured to operate as described above with reference to the second network node 12 shown in FIG. 1. In other words, the communication network 10 preferably comprises one or more application servers configured to host and execute the CCR service of the present invention. For sake of not limiting example, in the following description and in FIG. 2, reference will be made to two network nodes providing the CCR service, and these network nodes will be referred to as "first application server 12a" and "second application server 12b".

The communication network 10 preferably further comprises a further network node 13 (not shown in FIG. 1), preferably a further network server, which is configured to store information about the multimedia communication sessions, in particular the voice calls, established between the subscribers to the CCR service, as it will be described herein after. In the following description, this further network node 13 will be indicated as "Call Collision Request server" or, shortly, "CCR server". The CCR server 13 is preferably connected to the application servers 12a, 12b though an interface. As an example, this interface may be implemented as a REST (REpresentational State Transfer) interface transferring data over HTTP or by means of a web service over HTTP.

Preferably, according to the present invention, the first user A and the second user B are subscribers to the CCR service provided by a service provider by means of the application server(s) 12a, 12b. Upon subscription to the CCR service by a user, data identifying the subscriber are preferably stored in a network database, located, for instance, in a dedicated network server (not shown in the Figures). In the considered IMS network, the subscriber's data are stored in the home subscriber server (HSS) of the communication network 10, which, as known, stores data of users registered to the communication network, as described in, for instance, section 4.1.1.1 of the technical specification 3GPP TS 23.002 V14.0.0 (2016-09), "3rd Generation Partnership Project; Technical Specification Group Services and System Aspects; Network architecture (Release 14)". Preferably, the network database comprises, for each user registered therein, one or more user identifiers. In particular, the network database preferably comprises, for each user, one or more of: an IP multimedia private identity (IMPI), an IP multimedia public identity (IMPU), an international mobile subscriber identity (IMSI), a mobile subscriber ISDN number (MSISDN). Moreover, preferably, the network database comprises, for each user, a user service profile indicating the service or services delivered within the communication network 10 to which the user is subscribed. The user service profile preferably comprises, for each service, data indicative of at least one application server providing the considered service to the user (indicated in the following description as "reference application server").

It is assumed herein after, for sake of example, that, upon subscription of user A to the CCR service according to the present invention, the user service profile of user A stored in the network database comprises data indicating the first application server 12a as the reference application server for the CCR service provision. Moreover, it is assumed that upon subscription of user B to the CCR service according to the present invention, the user service profile of user B stored in the network database comprises data indicating the second application server 12b as the reference application server for the CCR service provision. It is to be noticed that this choice of the reference application server for the provision of the CCR service to users of the communication network is merely exemplary. Upon subscription to the service, the two users A, B may be as well associated to a same application server as reference application server for the provision of the CCR service. Indeed, according to the present invention, upon subscription of a user to the CCR service, the selection of the reference application server may be performed according to different criteria. For instance, selection may be based on load balance criteria, which are directed at balancing the workload between application servers delivering the CCR service (e.g. DNS load balancing).

Figure 2:
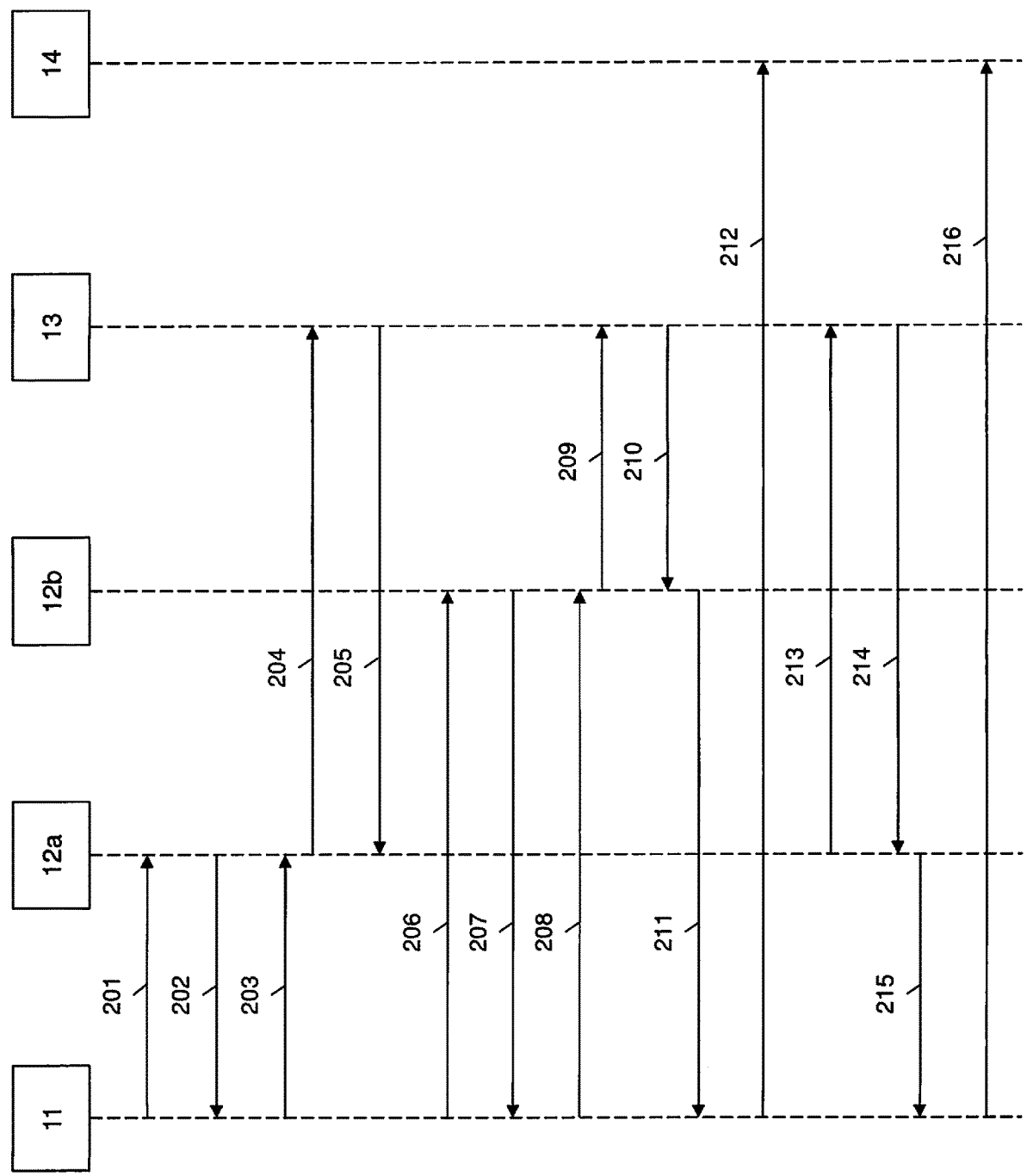
FIG. 2 is a flowchart of the steps of the method according to the present invention.

With reference to FIG. 2, the method according to the present invention will be described in detail herein after. The method will be described with reference to an exemplary situation of call collision, wherein user A calls user B and substantially at the same time user B calls user A (in particular, user B calls user A after user A has started the call to user B, but before being reached by that call).

A call collision between user A and user B, within the meaning of the present invention, is caused by the latency experienced by the call request coming from the calling user device A and directed to the called user device B through the communication network 10. The time interval needed to transfer the call request from the calling user device A to the called user device B depends on the communication network 10 (namely, it depends on the topology of the network, the operative conditions of network devices and links, etc.). If during this time interval, user B calls user A, a call collision will occur, unless in the meanwhile user A decides to drop her/his call to user B. More precisely, call collision occurs when, during the time interval mentioned above, the call request from user device A to user device B reaches user device B that sends an answer message indicating that user device B is busy, and the call request from user device B to user device A reaches user device A that sends an answer message indicating that user device A is busy.

As mentioned above, in order to set up a call with the device of user B, the device of user A sends a first call request message to the first network node 11. The first call request message is formatted according to the communication session protocol used within the communication network 10. Preferably, the first call request message is formatted according to the SIP protocol. In particular, the first call request message is a SIP INVITE request message.

The first call request message preferably comprises a header comprising a number of fields containing a calling party address (namely, an identifier of the calling user, which is user A in this example, associated with her/his user device), and a called party address (namely, an identifier of the called user, which is user B in this example, associated with her/his user device). According to the SIP protocol, the calling party address and the called party address are in the form of Uniform Resource Identifiers (URI), in particular in the form of SIP URIs, and are located in the "From" header field and in the "To" header field, respectively, of the SIP INVITE request message.

The first call request message sent by the user device A to the first network node 11 may reach the first network node 11 though other intermediate nodes, as already cited above. The first network node 11, upon reception of the first call request message from user device A, preferably checks the network database on the basis of the identifier of the calling user contained in the request message (namely, according to the SIP protocol, the SIP URI of the calling user A) and retrieves the user service profile of user A. In particular, the first network node 11 retrieves in the user service profile the indication of the reference application server for the provision of the CCR service for the calling user, namely, in this exemplary case, an indication that the first application server 12a is the reference application server for user A for the provision of the CCR service.

At step 201 of FIG. 2, the first network node 11 preferably forwards the first call request message to the first application server 12*a*. The first application server 12*a* preferably puts itself in the routing path of the call from user A to user B, namely in the path of the signaling messages related to the call from user A to user B. In particular, preferably, the first application server 12*a* modifies the first call request message by inserting therein a header field comprising an identifier of the first application server 12*a*, to force future signaling messages related to the call from user A to user B to be routed through the first application server 12*a*. According to the SIP protocol, preferably, the first application server 12*a* inserts a Record-Route header field into the SIP INVITE request message, the Record-Route header field containing a SIP URI of the first application server 12*a*.

Then, at step 202, the first application server 12*a* sends back the first call request message to the first network node 11. At this point, the first network node 11 tries to route the first call request message towards the called user device, i.e. the user device B. However, since user B is calling user A, the user device B preferably returns to the first network node 11 an answer message indicating that the called user device is not able to answer the call because it is busy. According to the SIP protocol, the answer message is a 486 (Busy Here) response. The answer message is preferably forwarded by the first network node 11 to the first application server 12*a* (step 203 in FIG. 2), since it is in the routing path of the call from user A to user B.

The first application server 12*a*, upon reception of the answer message indicating that user device B is busy, preferably sends an inquiry message to the CCR server 13 (step 204), the inquiry message indicating that user device A is calling user device B and asking if user device B is in its turn calling user device A. In particular, the inquiry message indicates that user device A has sent the first call request message to user device B and asks if user device B has in its turn sent a call request message to user device A. As mentioned above, the inquiry message sent from the first application server 12*a* to the CCR server 13 may be an HTTP message. The CCR server 13 preferably stores the information that user device A is calling user device B in a database, identified in the following as "Call Collision Request database" or, shortly, "CCR database". Then, preferably, it checks the CCR database to find whether a similar information indicating that user device B is calling user device A is already present therein. At this point of the procedure, the CCR database does not contain any indication that user device B is calling user device A. Hence, the CCR server 13 preferably generates and sends to the first application server 12*a* an outcome message indicating that the CCR database does not contain any information about an ongoing call from user device B to user device A (step 205). As mentioned above, the outcome message sent by the CCR server 13 to the first application server 12*a* may be an HTTP response.

Upon reception of the outcome message from the CCR server 14, the first application server 12*a* preferably interrupts the call from user device A to user device B for a given interval of time Tx, i.e. it does not send any answer message to user device A for the time interval Tx. Preferably, the time interval Tx during which the call is interrupted is equal to few seconds, for instance 2 seconds.

In the meantime, since, as mentioned above, user B is calling user A, user device B sends a second call request message to the first network node 11. The second call request message sent from user device B to the first network node 11 is formatted according to the communication session protocol used within the communication network 10, similarly to the first call request message sent from user device A to the first network node 11 described above.

The second call request message sent by the user device B to the first network node 11 may reach the first network node 11 though other intermediate nodes, as already cited above. The first network node 11, upon reception of the second call request message from user device B, preferably checks the network database on the basis of the user identifier of the calling user contained in the second call request message and retrieves the user service profile of user B. In particular, the first network node 11 retrieves from the user service profile the indication that the second application server 12*b* is the reference application server for user B for the provision of the CCR service.

At step 206 of FIG. 2, the first network node 11 preferably forwards the second call request message to the second application server 12*b*. The second application server 12*b* preferably puts itself in the routing path of the call from user B to user A. In particular, preferably, the second application server 12*b* modifies the second call request message by inserting therein a header field comprising an identifier of the second application server 12*b*, to force future signaling messages related to the call from user B to user A to be routed through the second application server 12*b*. According to the SIP protocol, preferably, the second application server 12*b* inserts a Record-Route header field into the SIP INVITE request message, the Record-Route header field containing a SIP URI of the second application server 12*b*.

Then, at step 207, the second application server 12*b* sends back the second call request message to the first network node 11. At this point, the first network node 11 tries to route the second call request message towards the called user device, i.e. the user device A. However, since user A is calling user B, the user device A preferably returns to the first network node 11 an answer message indicating that the called user device is not able to answer the call because it is busy. The answer message is then preferably forwarded by the first network node 11 to the second application server 12*b* (step 208 in FIG. 2).

The second application server 12*b*, upon reception of the answer message indicating that user device A is busy, preferably sends an inquiry message to the CCR server 13 (step 209), the inquiry message indicating that user device B is calling user device A and asking if user device A is calling user device B. The CCR server 13 preferably stores the information that user device B is calling user device A in the CCR database. Then, preferably, it checks the CCR database to find whether a similar information is already present therein indicating that user device A is calling user device B. At this point of the procedure, the CCR server 13 finds in the CCR database the information that user device A is calling user device B (as it has been stored in the CCR database in correspondence of step 204 described herein above). Hence, the CCR server 13 preferably generates and sends to the second application server 12*b* an outcome message indicating that the CCR database contains the information about an ongoing call from user device A to user device B (step 210).

After having received the outcome message from the CCR server 13, the second application server 12*b* preferably routes the call from user device B to an ad-hoc conference bridge 14. In particular, at step 211, the second application server 12*b* modifies the second call request message in order to set up the call between user device B and the conference bridge 14, by inserting therein an identifier of the conference bridge 14. In particular, the second application server 12*b* routes the second call request message towards the conference bridge 14. According to the SIP protocol, the modified second call request message may be a SIP INVITE message having the "From" header field value set to the SIP URI of user device B, the "To" header field value set to the SIP URI of user device A and the "Request-URI" field value set to the SIP URI of the conference bridge.

Alternatively, at step 211, the second application server 12b may generate a new call request message (which may be indicated as "third call request message") addressed to the conference bridge 14 in order to set up a call with the conference bridge 14. In this case, the second application server 12b acts as a so-called Back-to-Back User Agent (B2BUA), according to the SIP protocol. Moreover, the second application server 12b preferably establishes an association between the call from user device B to user device A and the new call from the application server 12b to the conference bridge 14. According to the SIP protocol, the third call request message is a new SIP INVITE message, having the "From" header field value set to the SIP URI of user device B, the "To" header field value set to the SIP URI of user device A and the "Request-URI" field value set to the SIP URI of the conference bridge.

The identifier of the conference bridge is preferably determined by the second application server 12b by applying a given function F(A, B) to the identifiers of the calling user and the called user. The function F represents a sequence of given processing operations carried on the identifiers of the users involved in the call, which may comprise logical and/or mathematical operations performed on the identifiers of the users. Preferably, the outcome of the function F does not depend on an order according to which the identifiers of the calling user and the called user are processed, so that F(A, B)=F(B, A). For instance, if the identifiers of the calling user and the called user are numbers, the function F may give the identifier for the conference bridge by sorting the calling user number and the called user number in ascending order and concatenating them by a predetermined alphanumeric character, such as "-". For example, if the number of user A is "3339999999" and the number of user B is "3331111111", then F(A, B)=F(B, A)="3331111111-3339999999".

It is to be noticed that, according to the present invention, each application server 12a, 12b providing the CCR service within the communication network 10 is configured to determine the identifier of the conference bridge in the same manner, starting from the identifiers of the users involved in the call collision. In other words, according to the present invention, each application server 12a, 12b providing the CCR service is configured to process the users' identifiers according to a same logic to determine the identifier of the conference bridge. In this way, as it will be clearer from the following description, the application server(s) 12a, 12b configured to provide the CCR service to two users involved in a call collision is(are) able to route the calls from the two users to the same conference bridge.

Referring back to FIG. 2, the modified second call request message (or, alternatively, the third call request message) generated by the second application server 12b to set up a call between user device B and the conference bridge is forwarded to the conference bridge 14 via the first network node 11 (steps 211 and 212).

In the meanwhile, after the time interval Tx elapsed, the first application server 12a sends a further inquiry message to the CCR server 13 asking again to the CCR server 13 whether user device B is calling user device A (step 213). The CCR server 13 preferably checks the CCR database to find whether the information indicating that user device B is calling user device A is already present therein. At this point of the procedure, in case of call collision, the CCR server 13 finds in the CCR database the information that user device B is calling user device A (as it has been stored in the CCR database in correspondence of step 209 described herein above). Hence, the CCR server 13 preferably generates and sends to the first application server 12a an outcome message indicating that the CCR database contains the information about an ongoing call from user device B to user device A (step 214).

After having received the outcome message from the CCR server 13, the first application server 12a preferably routes the call from user device A to user device B to the ad-hoc conference bridge 14. In particular, the first application server 12a preferably determines the identifier of the conference bridge, as already described above with reference to the operation of the second application server 12b, and modifies the first call request message in order to set up a call between user device A and the conference bridge 14. The first application server 12a hence determines the same identifier for the conference bridge 14 as already determined by the second application server 12b. Then, the first application server 12a routes the first call request message towards the conference bridge 14 by modifying the first call request message in order to set up a call between user device A and the conference bridge 14. According to the SIP protocol, this may be done by introducing in the "Request-URI" field value of the SIP INVITE message the SIP URI of the conference bridge. The modified second call request message is then preferably forwarded to the conference bridge 14 via the first network node 11 (steps 215 and 216). As already described above, alternatively, the first application server 12a may generate a new call request message (which may be indicated as "fourth call request message") in order to set up a call with the conference bridge 14, and establish an association between the call from user device A to user device B and the new call from the application server to the conference bridge. In this case, as already mentioned above, the first application server 12a acts as a B2BUA, according to the SIP protocol. Moreover, according to the SIP protocol, the fourth call request message is a new SIP INVITE message, having the "From" header field value set to a SIP URI of user device A, the "To" header field value set to the SIP URI of user device B and the "Request-URI" field value set to the SIP URI of the conference bridge.

At the end of the steps illustrated in FIG. 2, the call from user A to user B and the call from user B to user A are bridged together in a conference call handled by the ad-hoc conference bridge 14, and users A, B may start talking to each other. At the start of the conference call, the conference bridge 14 may play an announcement message to inform the users A, B that the CCR service has been activated.

It is to be noticed that, upon reception of the inquiry message at step 213, if the CCR server 13 does not find in the CCR database the information that user device B is calling user device A, at step 214 the CCR server preferably sends to the first application server 12a an outcome message indicating that the CCR database does not contain any information about an ongoing call from user device B to user device A. At this point, the first application server 12a preferably forwards the answer message indicating that user B is busy (which has been received by the first application server 12a from user device B through the first network node 11 at step 203) to user device A.

The inventor noticed that the time interval Tx, which represents the amount of time during which the call from user A to user B is interrupted at the first application server 12a, is to be chosen properly. Indeed, the inventor noticed that the time interval Tx should be long enough to intercept both the call from user A to user B and the call from user B to user A (i.e. to intercepts a call collision within the meaning of the present invention) but not too long to cause a delay in the delivery of the answer message indicating to the calling user that the called user is busy when a call collision has not occurred. Indeed, if the calling user gets the "busy" answer with a significant delay, its user experience would be degraded. The inventor noticed that the time interval Tx may be equal to 2-3 seconds.

The method according to the present invention advantageously allows resolving a call collision in a communication network, in particular, in the considered IMS network, in an efficient manner by bridging the calls together in a conference. In this way, the user experience is improved with respect to the known method described above. Indeed, none of the calls that are colliding is dropped by the communication network and both users are redirected to a conference without experiencing any unexpected situation, such as the ringing of the phone at a user's ear while she/he still believes she/he is the calling party.

Finally, advantageously, the method according to the present invention may be implemented in an IMS network without the need to modify/adapt the network nodes of the IMS network. Indeed, the method may be implemented by simply adding an application server in the IMS network, the application server using the standard ISO interface.

The invention claimed is:

1. A method for resolving a call collision in a communication network, said method comprising, at a network node of said communication network:
   receiving a first call request message from a first user device to set up a call from said first user device to a second user device;
   determining that said second user device has in turn sent a second call request message to set up a call from said second user device to said first user device; and
   based on said determining, routing said first call request message to a conference bridge.

2. The method according to claim 1, wherein said receiving said first call request message comprises modifying said first call request message by inserting therein an identifier of said network node.

3. The method according to claim 2, further comprising, after receiving the first call request messages, receiving from said second user device an answer message indicating that said second user device is busy, and wherein said determining comprises sending an inquiry message to a further network node of said communication network indicating that said first user device sent said first call request message and asking if said second user device sent said second call request message.

4. The method according to claim 3, further comprising, at said further network node, storing information indicating that said first user device sent said first call request message and sending to said network node an outcome message indicating that said second user device has not sent said second call request message.

5. The method according to claim 4, further comprising, at said network node, upon reception of said outcome message, interrupting said call from said first user device to said second user device for a pre-determined interval of time.

6. The method according to claim 5, further comprising, after said pre-determined time interval elapsed, sending a further inquiry message to said further network node of said communication network asking if said second user device sent said second call request message.

7. The method according to claim 1, wherein said routing further comprises modifying said first call request message by inserting therein an identifier of said conference bridge to route said first call request message to said conference bridge.

8. The method according to claim 1, wherein said routing further comprises generating a third call request message to set up a call from said network node to said conference bridge and inserting in said third call request message an identifier of said conference bridge to route said third call request message to said conference bridge.

9. The method according to claim 7, further determining said identifier of said conference bridge as a function of identifiers associated with said first user device and said second user device.

10. The method according to claim 1 further comprising:
    receiving said second call request message from said second user device to set up a call from said second user device to said first user device;
    determining that said first user device has in turn sent said first call request message to set up said call from said first user device to said second user device; and
    based on said determining, routing said second call request message to said conference bridge.

11. A non-transitory computer-readable storage medium storing software code portions that, when executed by a computer, perform the method of claim 1.

12. A network node for a communication network in a communication system comprising a first user device and a second user device, the network node comprising at least one computing device configured to:
    receive a first call request message from said first user device to set up a call from said first user device to said second user device;
    check whether said second user device has in turn sent a second call request message to set up a call from said second user device to said first user device; and
    in affirmative case that said second user device has sent said second call request message, route said first call request message to a conference bridge.

13. A communication system comprising a communication network, a first user device and a second user device, each of said first user device and said second user device being configured to set up a call with the other of said first user device and said second user device through said communication network, wherein said communication network comprises said network node according to claim 12.

14. The communication system according to claim 13, wherein said communication network is an IP multimedia subsystem network and said network node is an application server of said communication network.

15. The communication system according to claim 14, wherein said first call request message is a SIP INVITE message.

* * * * *